June 3, 1952
R. M. M. OBERMAN
2,598,822
SIGNALING SYSTEM WITH PRIVATE BRANCH EXCHANGE SUBSCRIBER
Filed July 30, 1947
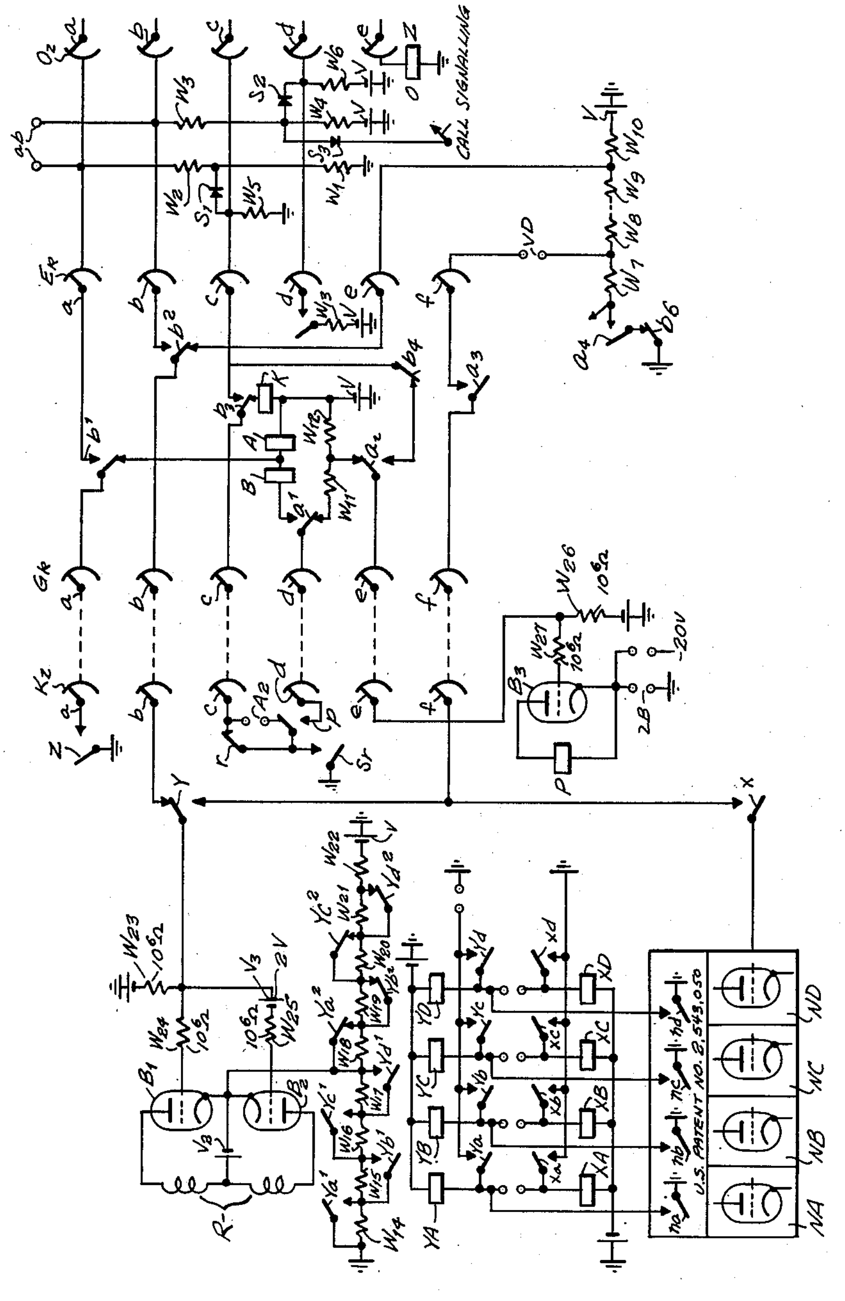
INVENTOR.
ROELOF M. M. OBERMAN
BY
[signature]
agt Patented June 3, 1952 2,598,822

UNITED STATES PATENT OFFICE 2,598,822

SIGNALING SYSTEM WITH PRIVATE BRANCH EXCHANGE SUBSCRIBER

Roelof M. M. Oberman, The Hague, Netherlands

Application July 30, 1947, Serial No. 767,530
In the Netherlands October 13, 1945

Section 1, Public Law 690, August 8, 1946
Patent expires October 13, 1965

1 Claim. (Cl. 179—18)

The invention refers to a signalling system, in particular a telegraph- or telephone system, in which certain subscribers so to say belong together in groups.

In the usual automatic telegraph- and telephone systems the lines of certain subscribers can be searched successively by a final selector, in the same way as a group selector makes a free selection from a group of lines. As a rule the lines of such a subscriber are characterized in a special manner, such that the final selector is first directed to a position corresponding with the so called P. B. X number. If this connection is busy, the final selector—in consequence of the special characteristic belonging to this so called starting line—is started once more to make a free selection from a number of so called intermediate lines which follow direct to the starting line, in order to stop on the last line of the P. B. X subscriber, the so called stop line, if the intermediate lines are all busy.

Some systems are so equipped that a final selector does not search the following lines of the P. B. X subscriber, if not the P. B. X number but the number of one of the intermediate lines is selected. This facility gives the convenience that after closing time of an office certain numbers of the P. B. X subscriber can be switched through. A drawback of this manner of establishing P. B. X subscribers is the fact that always an important part of the number capacity of the exchange must remain reserved to be able to extend P. B. X subscribers without number changing, while moreover there is no possibility not to give a number to certain lines of a P. B. X subscriber.

This last difficulty can be overcome in systems in which a special positioning circuit is applied to the final selector, e. g. a characteristic selector. The system according to the invention solves this difficulty for those automatic systems in which the control of all selecting stages is effected wholly by and from the register by means of some marking system, either a direct current or an alternating current marking system.

The system according to the invention is obtained by connecting the contacts of an arch of the final selector if necessary over a distributor to a source of the control marking such that the lines of one P. B. X subscriber are connected all of them to the same said source, the contacts of another arch of the final selector being connected to a resistance which indicates the characteristic of the relevant line of the P. B. X subscriber as starting- or intermediate- and stop line, so that a testing equipment in the register after the busy testing of a subscriber can operate for the testing of the last mentioned contact of the final selector, whereupon only in the case that this position is characterized as "starting line" a test in the register of the first mentioned contact of the final selector follows to the marking criterion of the P. B. X subscriber, which criterion is given to the testing equipment of the selector control in the register, whereupon the final selector is again moved by the register and with one wiper searches for the characteristic of the revelant P. B. X subscriber which has just been determined; the final selector is only stopped when the testing equipment of the marking criterion which characterizes the lines of the P. B. X subscriber operates simultaneously the testing equipment of the contacts, which are characterized with a pole of the battery as free intermediate lines or as stop lines.

The invention will be described nearer by means of the annexed figure representing the line circuit of a subscriber, a final selector circuit and in principle a register arrangement necessary for the control of the final selector circuit.

The establishment of the connection is built up in the example inclusive of the positioning of the indicated group selector. As introduction to the positioning of the final selector the group register relays XA—XD corresponding with the transmitted tens digit is connected over contacts of the control switch to the group of the wiping relays YA—YD. Thereby this last group of relays is energized in the same combination as the group of register relays which is coupled with these relays. The contacts *ya1*—*yd2* so switch in the group of resistances W14—W21 that a particular direct voltage is applied as comparison voltage to a zero voltage discriminator which further on will be called zero switch. The positioning of the final selector circuit is further prepared by earthing the *a*-wire in the register by means of the contact *z*. This makes the A relay in the final selector circuit attract the armature.

The *a1* contact prepares the holding circuit of the two A and B relays of the final selector circuit after the positioning has come ready. The *a2* contact definitively interrupts the control marking which was necessary for the positioning of the group selector. Next the final selector is started by closing the *sr* contact, whereby the driving magnet K of the final selector is energized. The control wiper *e* wipes a number of different voltages, which are determined e. g. by a potentiometer consisting in 20 resistances, of which only the resistances W7—10 have been represented in the figure. An alternating current marking can also be used for this purpose. The contacts 1, 11, 21 . . . 91 of a hundredfold rotary switch for the positioning according to the tens digit are characterized with a series of 10 different voltages, while the intermediate groups of 9 contacts at an equal unit digit obtain an equal potentiality, which, however, is always different from the one which is used for the first mentioned contacts. So there are totally 19 different voltages required for the systematical numbering of the positions of a final selector with one wiper.

The *b*-wire to the final selector circuit is connected in the register to the zero switch, which is only indicated in principle. This equipment contains, two testing tubes B1 and B2, a differential relay R and the voltage sources V2 and V3. The two testing tubes are in an equal conductive position, either conductive or non-conductive, as long as the control wiper does not wipe a contact, of which the control voltage is equal to the comparison voltage. If the last mentioned fact is the case the tube B1 becomes or remains conductive, while the tube B2 remains or becomes non-conductive.

The register R attracts the armature in consequence of the energization of one coil. The *r* contact interrupts the circuit of the driving magnet K so that the selector stops. The contact of the control switch A2 is still open. The positioning according to the tens digit is ready.

There are now two possibilities, namely the unit digit is zero or not. If the unit digit is a zero, the positioning of the final selector is wholly ready if the relevant subscriber is a normal single one. In that case the positioning of the final selector according to the unit digit can be suppressed. If the unit digit is not a zero, the group of register relays (not shown in the drawing) belonging to the unit digit, is brought into connection with the group of wiping relays YA—YD. The selector is started in the manner as described and stopped when the contact is reached, which is characterized with the correct control voltage.

Now there are again two possibilities, namely the relevant subscriber is free or busy. The register by means of the tube B3 can test the *c*-wire of the line circuit. The *c*-wire of the line circuit is namely earthed or in consequence of line leak has a slight negative voltage if the subscriber is free (e. g. between 0 and —1 volt), while this wire owing to the lifting of the handset obtains such a negative voltage, that the testing equipment in the register tests this subscriber busy (e. g. —2 volt). The cathode of the testing tube B3 is connected to earth over the contact of the control switch B2. In consequence the tube B3 is only conductive, when the wiper in the line circuit likewise finds earth. The characteristic of the tube 3 then must be so chosen that this tube is non-conductive from a grid voltage of —1 volt.

If the relevant subscriber is free, relay P attracts the armature, whereupon the register can switch the connection through.

If the subscriber is not free, it has to be found out, whether the relevant number is not the chief number of a P. B. X subscriber. P. B. X subscribers can be applied in various ways in the final selectors of marking systems, in which the selectors are wholly controlled by the register. It would for instance be possible to equip the subscribers with individual potentiometers, which indicate the necessary control voltage and which control voltage is disarranged for the busy lines of a P. B. X subscriber, except the last so called stop line. Then the lines with equal control voltage can belong to one and the same P. B. X subscriber, as e. g. the subscriber with equal unit digit in the relevant hundred. Moreover, lines without number can be added, if the number of positions of the final selector is greater than the number of systematically numbered lines.

Then it is avoided with that system that for the extension of P. B. X subscribers some numbers are to be reserved permanently, which would mean a decrease of the exchange subscribers capacity.

A drawback of the system mentioned here, however, is that the numbered lines of such a P. B. X subscriber must always inevitably differ 10 in number.

If it would be acceptable to have P. B. X subscribers with a numbered line and some unnumbered lines, the mentioned system would be sufficient. If this is not the case and it is thought necessary to dispose of one or more numbered following lines, which at the same time must be reachable as individual connection, the mentioned system is insufficient.

This problem may be solved as follows in systems where the selector positioning is wholly effected under the control of a register, by equipping all the selectors with an extra wiper. The final selector contacts belonging to this wiper—in so far as they belong to a P. B. X subscriber—are connected by means of a distributor connected to a control voltage, which is characteristic for all the lines of one P. B. X subscriber. In the example where use is made of a direct voltage as control voltage, without more there are already 19 different characteristics present for P. B. X subscribers.

If desired this number can be extended. The numbers of the lines of such P. B. X subscribers are no longer subject to restriction. The numbered lines can be taken arbitrarily within the number group of the relevant final selector, while unnumbered lines may be added. By means of the W5 resistance, which is connected to the *c*-wire of the line circuit, the P. B. X property can be applied to one or if required to more of the lines of the same subscriber, which have been comprised in the systematical numbering. When selecting the P. B. X number and finding the chief line of this number busy, the final selector starts once more searching for a free line belonging to this P. B. X number. The so called intermediate lines without group properties of the P. B. X number can e. g. also be provided with a number from the systematical numbering; when selecting, only one number is searched. These intermediate lines are characterized with another W5 resistance of the *c*-wire.

If desired, the final selector can search uninterruptedly for a free line in the relevant P. B. X subscriber.

If this should not be desired, the last line of the P. B. X subscriber, the so called stopline, is provided with a third characteristic at the *c*-wire, which is such that the final selector at this line stops to test thereafter if it is free or busy.

If the line corresponding with the P. B. X number is busy, the positioning of a final selector for a P. B. X subscriber can further be effected as follows. The line circuit *c*-wire of the desired but busy number is connected in the junction circuit over a particular resistance to —battery, the voltage at the *c*-wire of the line circuit being such that the blocking cell S1 is in the non-conductive position. This voltage can be —24 volt e. g. for the so called starting line of a P. B. X subscriber.

The *c*-wire of the line circuit can in the register e. g. over an *e*-wire of the selector circuits be tested by means of a testing equipment as described in U. S. Patent No. 2,543,050. This equipment can determine a particular voltage from a series of voltages chosen for instance with 2 volt difference. The characteristic to be indicated by the W5 resistance can serve for many indications besides those of the P. B. X subscribers. The characteristic met with on the line circuit can e. g. be fixed in a group of four relays, if the total number of characteristics does not amount to more than 15.

If it has been ascertained in this way that the relevant line is the so called starting line of a P. B. X subscriber, the device described in my Patent No. 2,543,050 is connected over the X contact to the extra wire to the final selector circuit. Then the device detects in the form of the energization combination of four relays, which of the 15 different voltages has been brought into connection with the *f*-wiper of the final selector.

Thereupon this combination applies in the described manner a comparison voltage to the zero switch for the selector positioning. Then the final selector is started again, while now by the moving over of the Y contact searching takes place over the *f*-wire in the group of connections, which have been characterized with the control voltage met with at the starting line of the P. B. X subscriber. The zero switch consisting in the testing tubes B1 and B2, magnetizes the R relay for each connection belonging to the desired P. B. X subscriber.

At the same time the testing tube B3 of which the comparison voltage is yet earth potentiality, tests if the line circuit *c*-wire is free or busy. The P relay attracts the armature, when the *c*-wiper wipes a free line. Now the A-2 contact of the control switch is closed. Now the final selector movement is not interrupted before the R relay as well as the P relay have attracted the armature, so then the final selector is at a free line in the desired P. B. X subscriber. Then the connection can be switched through in known manner. The last line of a P. B. X subscriber is e. g. characterized in busy condition with a voltage of —20 volts at the line circuit *c*-wire.

For this testing the B3 tube may also serve, if the comparison voltage instead of earth is chosen at —20 v. In that case, however, for the characterizing of the following lines of the P. B. X subscribers no voltages may be used lying between —20 volts and earth. After stopping of the final selector the comparison voltage of the tube B3 must be switched back again to earth to test if the last line of the P. B. X subscriber is free or busy. When using a fourth testing tube the testing of a P. B. X subscriber's last line at its characteristic and its being free or busy can be effected simultaneously.

While I have illustrated and described what I regard to be the preferred embodiment of my invention, nevertheless it will be understood that such is merely exemplary and that numerous modifications and arrangements may be made therein without departing from the essence of the invention, I claim:

A telecommunication system, comprising in combination, a register; a selector having a plurality of contact banks; means for positioning said selector by said register; a plurality of lines including a group of P. B. X lines consisting of a first line, intermediate lines, and a stop line; means for connecting said lines to said selector; means for marking said lines connected to said selector by different potentials according as said lines are disengaged and busy; resistors forming part of said line marking means; a voltage source connected to said resistor so as to apply different marking potentials to said lines of said P. B. X group where the same are busy, said resistors having different resistance values so as to apply contact marking potentials having predetermined and different values for said first line, said intermediate lines, and said stop line of said group of P. B. X lines, respectively; a device in said register for moving said final selector, said device being responsive to the contact marking potentials so as to move said final selector when said first line of said P. B. X group is busy to a disengaged line of said intermediate lines of said P. B. X group, and when all of the latter are busy, to said stop line of said P. B. X group; and means for stopping said final selector when the same has reached said stop line of said P. B. X group.

ROELOF M. M. OBERMAN.

REFERENCES CITED

The following references are of record in the file of this patent:

UNITED STATES PATENTS

| Number | Name | Date |
|---|---|---|
| 2,237,413 | Clark | Apr. 8, 1941 |
| 2,380,950 | Deakin | Aug. 7, 1945 |
| 2,419,540 | Deakin | Apr. 29, 1947 |
| 2,454,781 | Deakin | Nov. 30, 1948 |
| 2,454,809 | Kurithof | Nov. 30, 1948 |

FOREIGN PATENTS

| Number | Country | Date |
|---|---|---|
| 55,722 | Netherlands | Dec. 15, 1943 |